Figure 1:
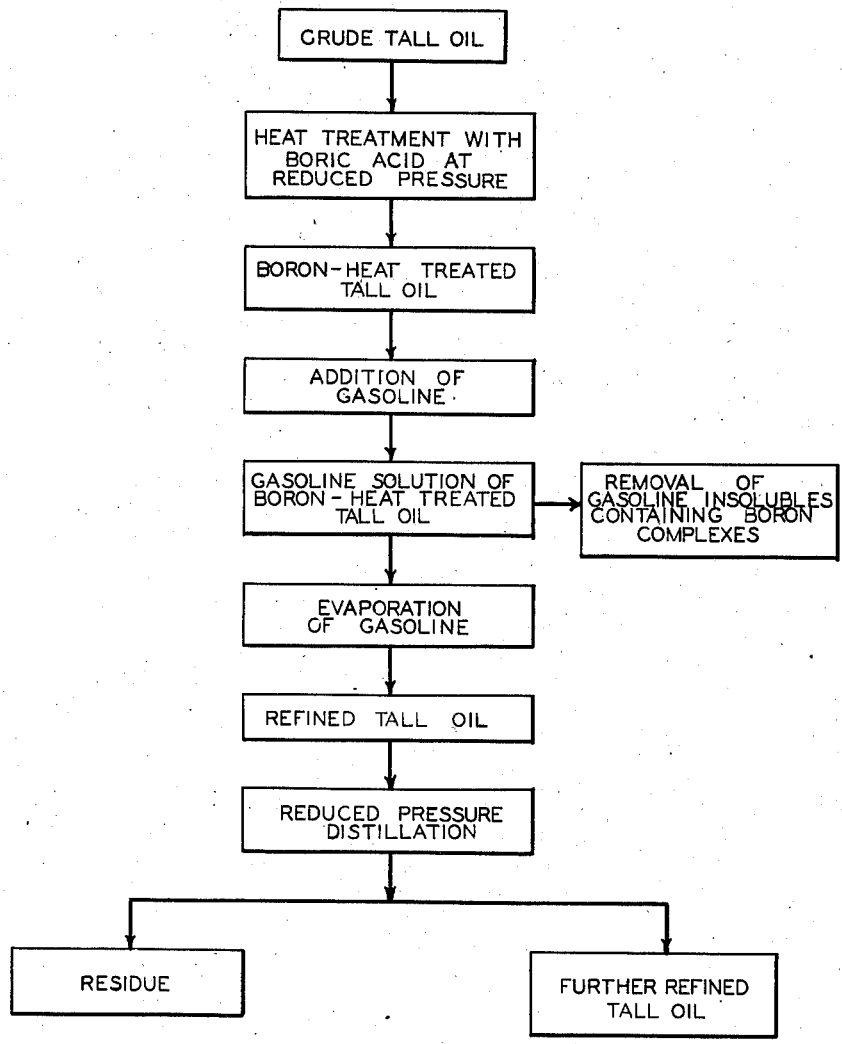

May 1, 1945.    J. N. BORGLIN    2,374,975
REFINING TALL OIL
Filed March 17, 1942    3 Sheets-Sheet 1

INVENTOR.
JOSEPH N. BORGLIN
BY
ATTORNEY

May 1, 1945.  J. N. BORGLIN  2,374,975
REFINING TALL OIL
Filed March 17, 1942  3 Sheets-Sheet 2

INVENTOR.
JOSEPH N. BORGLIN
BY Cleveland B. Hollabaugh
ATTORNEY

May 1, 1945.　　　J. N. BORGLIN　　　2,374,975
REFINING TALL OIL
Filed March 17, 1942　　　3 Sheets-Sheet 3

INVENTOR.
JOSEPH N. BORGLIN
BY
ATTORNEY

Patented May 1, 1945

2,374,975

UNITED STATES PATENT OFFICE 2,374,975

REFINING TALL OIL

Joseph N. Borglin, Wilmington, Del., assignor to Hercules Powder Company, Wilmington, Del., a corporation of Delaware Application March 17, 1942, Serial No. 435,045

12 Claims. (Cl. 260—97.5)

This invention relates to the refining of crude tall oil and, more particularly, to the use of boron compounds as a crude tall oil refining agent.

In the manufacture of paper pulp, the wood chips which form the basis of the pulp are acted on by an alkaline liquor which attacks the non-cellulose constituents as, for example, fatty and resin acids, and leeches them from the cellulose. The fresh alkaline liquor which is used in this so-called cooking operation is known as the white liquor and the spent liquor of digestion which is drained from the pulp is known as the black liquor. This black liquor contains the non-cellulose constituents of wood, the major portion of which is made up of the resin and fatty acids in the form of the sodium soap. Upon cooling of the black liquor, the soaps separate and float on the top of the liquor due to the salting out action of the strong alkali. This floating matter is known in the trade as crude tall oil soap. This crude tall oil soap is characterized as being dark brown, impure, and highly ill-smelling. Upon treatment of the soap with an acid a less dark brown, viscous, oily product is obtained and known in the trade as tall oil.

Within limits reported in the literature, tall oil contains 25% to 60% fatty acids, mainly of the oleic series, 25% to 60% resin acids, which may include 50% to 90% abietic acids, and 7% to 20% unsaponifiable material. This unsaponifiable material may contain phytosterol, lignin, mercaptans, and higher alcohols.

The removal of latent and visible color bodies and odor producing compounds of the tall oil is desirable commercially but has always been a difficult problem. The exact constitution or nature of these visible color bodies is unknown. Invisible or latent color bodies develop color when the tall oil is subjected to certain treatment, for example, saponification. The visible color bodies can be largely removed by ordinary reduced pressure distillation. This procedure, however, does not remove the latent color bodies nor does it yield as light a colored product as may be desired. Further disadvantages of the distillation method are the occurrence of equipment corrosion which occurs during the distillation process, and partial destruction of the relatively commercially valuable fatty and resin acid components.

In accordance with this invention, tall oil may be refined by treating the tall oil with a boron compound and thereafter separating the boron complexes leaving refined tall oil. The separation is accomplished after treating with a boron compound by subjecting the boron treated tall oil to either a solvent extraction operation or a distillation operation. Reduced pressure distillation of the tall oil in the presence of a boron compound, or the heating of a solvent solution of tall oil in the presence of a boron compound followed by cooling and subsequent separation of the phases will also effect separation.

More specifically, the refining of the tall oil in accordance with the process of this invention is carried out by first heating the tall oil in the presence of a suitable boron compound at atmospheric or reduced pressure. This boron treated tall oil solution may then be refined by means of solvent extraction or distillation or both as diagrammatically shown in Fig. 1. The boron treated tall oil may be dissolved in any suitable solvent which causes the precipitation of insoluble matter and a boron compound impurity. After removal of the precipitated materials, the solvent may be evaporated to recover the refined tall oil. This refined tall oil may be further treated by subjecting the refined tall oil to a reduced pressure distillation operation.

When the refining of the boron treated tall oil is made by means of reduced pressure distillation, the operation may be either regular, flash, batch or continuous. The distillation permits recovery of a distillate rich in fatty and resin acids, and a residue containing the boron compound complexes.

Figure 2:
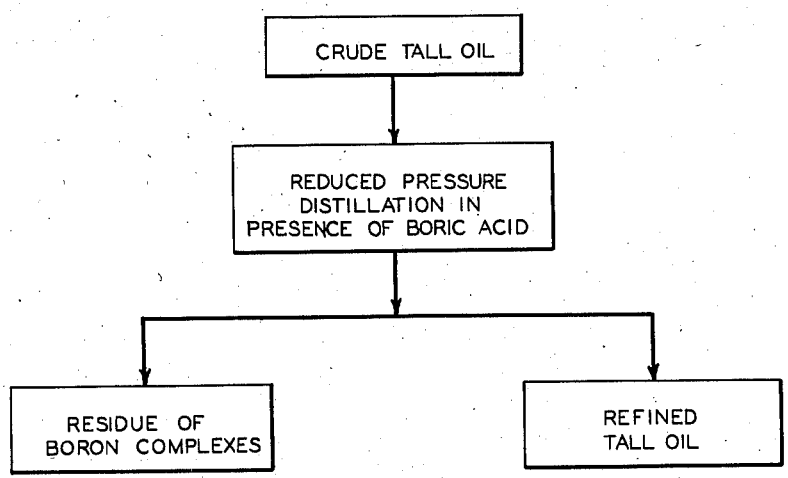

The crude tall oil may be treated in the manner diagrammatically shown in Fig. 2 which comprises subjecting the tall oil to a reduced pressure distillation operation at a temperature of about 250° C. in the presence of a suitable boron compound, whereupon a distillate is obtained rich in fatty and resin acids and a residue containing a boron compound complex.

Figure 3:
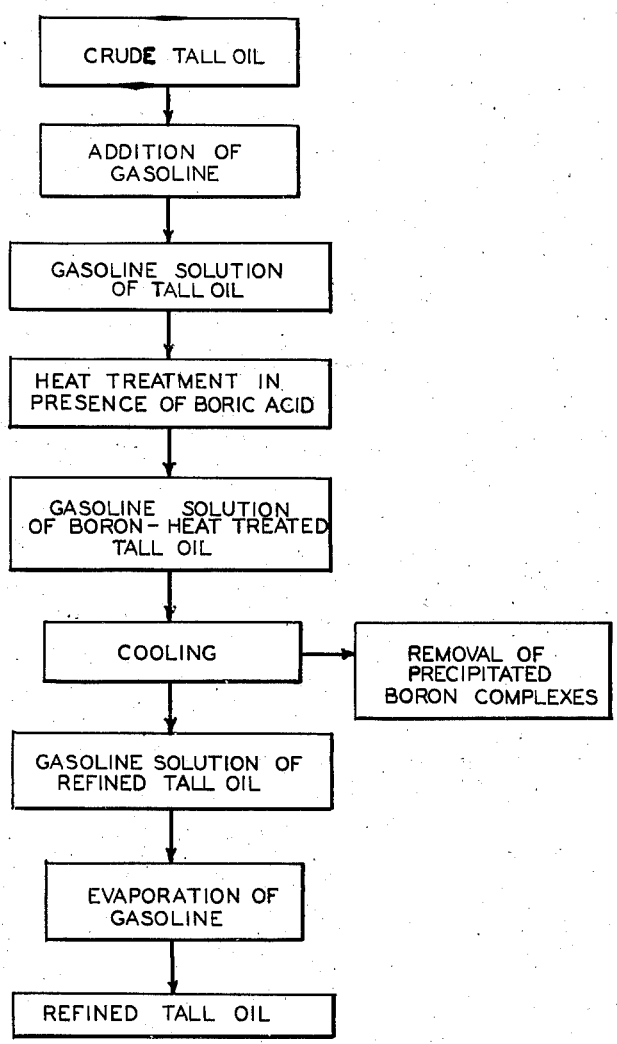

The crude tall oil may also be treated in the manner diagrammatically shown in Fig. 3 which comprises dissolving the tall oil first in a suitable solvent and then heating the solvent solution of tall oil in the presence of the boron compound. Cooling of this heated solution of boron treated tall oil causes the boron compound impurities to precipitate which may be removed by filtration. The clear solvent solution of tall oil is then subjected to a distillation operation to remove the solvent and permit recovery of the refined tall oil.

The method in accordance with this invention is illustrated by the following specific examples:

EXAMPLE 1

Boric acid—Distillation treatment 200 g. of dark colored tall oil grading D on the rosin color scale was distilled under a reduced pressure of 10 mm. of mercury in the presence of 2 g. of boric acid at a maximum temperature of 300° C. The distillate and residue obtained from this operation analyzed as follows:

|  | Residue | Distillate |
|---|---|---|
| Yield...........................................per cent.. | 49.5 | 50.5 |
| Acid number....................................... | 68 | 144 |
| Saponification number............................. | 44.5 | 1.652 |
| Refractive index................................... |  | 1.49999 |
| Color grade....................................... | Dark | X+ |
| Composition: |  |  |
| Rosin......................................per cent.. |  | 26 |
| Fatty acid.....................................do.... |  | 73.7 |

EXAMPLE 2

*Sodium tetraborate—Flash distillation treatment*

300 g. of dark colored tall oil grading D on the rosin color scale was heated at 150° C. for 15 minutes with 3 g. of sodium tetraborate. The treated tall oil was then subjected to a flash distillation operation at a reduced pressure of 5 mm. of mercury at a temperature of 275° C. whereby 225 g. of distilled product was obtained. This product graded WW on the rosin color scale and yielded soaps upon saponification having superior color.

EXAMPLE 3

*Boric acid—Solvent extraction treatment*

300 g. of dark colored tall oil grading D on the rosin color scale was heated at 150° C. for 15 minutes with 3 g. of boric acid. To this boron treated tall oil mixture was added 1500 g. of gasoline and the mixture agitated at 25° C. The gasoline phase of tall oil separated from the precipitated insoluble matter and the boron compound impurities. Evaporation of the gasoline by means of distillation resulted in 250 g. of refined tall oil having a color of H on the rosin color scale. 100 g. of this refined tall oil was further refined by means of distillation at a reduced pressure of 5 millimeters of mercury at a maximum bath temperature of 275° C. whereupon 85 g. of distillate was recovered which graded X on the rosin color scale.

EXAMPLE 4

*Boric anhydride—Solvent extraction treatment*

300 g. of dark colored tall oil grading D on the rosin color scale was dissolved in 1500 g. of gasoline and then heated at a maximum temperature of 125° C. for a period of 24 hours in the presence of 15 g. of boric anhydride. During this boric anhydride heating treatment, the mixture was thoroughly agitated. The mixture was cooled to 25° C. with agitation, whereupon the boric anhydride complex impurities precipitated and left a clear gasoline solution of refined tall oil which was then separated from the precipitate and subjected to a distillation operation to remove the gasoline. 260 g. of the refined tall oil was recovered having a color grade of H on the rosin color scale.

The methods utilized in carrying out the processes of this invention may involve reacting the crude tall oil itself or a solvent solution of the crude tall oil with a suitable boron compound. The reaction with crude tall oil itself may be brought about by heating the tall oil in the presence of a boron compound at a temperature from about 100° C. to about 300° C. and preferably from about 125° C. to about 175° C. at atmospheric pressure or at a reduced pressure. The heating operation may be carried out over a period of time of from about 1 minute to about 10 hours and preferably from about 5 minutes to about 2 hours. The amount of boron compound used may be from about 0.1% to about 10% and preferably from about 0.2% to about 5%.

Suitable boron compounds which have been found to exert a desirable refining action on the tall oil are boric acid, sodium tetraborate, commonly referred to as borax, boric anhydride, etc.

The boron treated tall oil mixture may be refined to remove the boron complexes by means of solvent extraction which comprises dissolving the boron treated tall oil mixture in a suitable solvent as, for example, gasoline, toluene, petroleum ether, etc., at a temperature of about 0° C. to about 150° C. and preferably at a temperature of about 20° C. to about 40° C. This solvent solution of the boron treated tall oil causes insolubles as, for example, the boron compound impurities to be precipitated from the mixture whereupon the solvent solution of tall oil is separated from the precipitated impurities and treated in any suitable manner as, by distillation to remove the solvent. Further treatment of this refined tall oil may be made by subjecting the refined tall oil to a reduced pressure distillation operation whereby still further refined tall oil distillate may be recovered.

The boron treated tall oil mixture may also be refined by subjecting the mixture to a reduced pressure distillation whereby the boron compound complexes which are of a low vapor pressure remain behind and the refined tall oil is distilled off. Distillation may be carried out as a continuous process, a batch process or a flash process. This reduced pressure distillation may be carried out at pressures of 1 mm. to 50 mm. of mercury and preferably less than 20 mm. of mercury. The bath or pot temperature of the distillation may be about 200° C. to about 300° C. and, if desired, the distillation may be carried out in the presence or absence of inert gas.

The tall oil may also be refined by subjecting the tall oil to a distillation operation at a reduced pressure in the presence of a suitable boron compound (Fig. 2). The distillation operation may be carried out under the conditions set forth with respect to distillation refining treatment of the boron treated tall oil hereinabove described.

A further modification for the refining of tall oil (Fig. 3) comprises dissolving the tall oil to be refined in any suitable solvent as, for example, gasoline, petroleum ether, toluene, etc., which solvent solution of tall oil is then heated with a boron compound. During the heating process which may be carried out at a temperature of about 75° C. to about 200° C. and preferably at a temperature of about 125° C. to about 175° C., the boron tall oil mixture is constantly agitated, whereby boron compound impurity complex precipitates. Precipitation of the boron compound impurity complex may be facilitated by cooling the mixture, after which the clear solution of solvent tall oil may be withdrawn from the boron compound impurities in any suitable manner as by decantation, filtration, or centrifuging, and the solvent evaporated from the refined tall oil in any suitable manner as by means of distillation. The refined tall oil may be further refined by subjecting the tall oil to a reduced pressure distillation operation.

The products obtained in accordance with the distillation methods of this invention are the distillate and the distillation residue. The distillate, which is a limpid liquid and rich in fatty and resin acids, may be saponified for use in soap, disinfectant, emulsifying agent, etc. If desired, the distillate or refined product obtained in accordance with this invention may be hydrogenated, heat treated, etc. to impart additional desired properties to the refined tall oil.

The precipitate or boron compound impurity complexes as obtained in accordance with the solvent extraction methods of this invention are valuable for uses in the arts. Although they are dark in color and of somewhat high melting point, they may be used as resin and saponified for use as emulsifying agents as, for example, in asphalt.

Further refining of the refined tall oil may be made by treatment with a suitable solid adsorbent as, for example, activated carbon, activated alumina, synthetic aluminum and magnesium silicate, fuller's earth, adsorbent clay, activated silica, activated bone black, silica flour, synthetic magnesium silicates, etc.

Treatment of the refined tall oil with any one of the above mentioned adsorbents consists in suspending or agitating the adsorbent in the refined tall oil or solution thereof and then separating the adsorbent with the further adsorbed color bodies from the tall oil solution, or it may consist in passing the refined tall oil in liquid phase through a mass of the adsorbent. The latter type of treatment is convenient as it combines contacting and separating at a single operation. This additional refining of the refined tall oil with any one of the above mentioned suitable adsorbents will preferably be given at a temperature of about 25° C. and may be given at a temperature between about 0° C. and about 50° C.

The theory involved in accordance with this invention is not definitely known; however, it appears that the boron compounds form a complex with the latent and visual color bodies present in the tall oil to be refined. Thus, heating of the tall oil in the presence of a suitable boron compound probably causes the formation of a boron impurity complex which is of low vapor pressure and therefore the higher vapor pressure constituents as, for example, the fatty and resin acid components of the tall oil may be removed from the boron impurity complexes by means of distillation. The boron impurity complexes are also of a decreased solubility, particularly in petroleum hydrocarbons which permit a further method of refining the tall oil as by solvent extraction, wherein the more soluble fatty and resin acids are separated from the non-soluble, boron impurity complexes.

In accordance with the methods of this invention, either the crude tall oil soap or the tall oil may be refined. Where crude tall oil soap is used as the raw material, treatment with any suitable mineral acid as, for example, sulfuric acid, or hydrochloric acid prior to refining, is used to reduce the soap mixture to the free, fatty and resin acids. Where tall oil is used as the raw material, this mineral acid treatment is not ncessary.

In accordance with this invention, the use of boron compounds provides an efficient means whereby the latent as well as visual color bodies in tall oil can be removed.

The odor of the tall oil is considerably improved by the above treatment.

What I claim and desire to protect by Letters Patent is:

1. The method of refining tall oil which includes heating tall oil in the presence of a boron compound capable of removing the visible or latent color bodies of said tall oil and subjecting the treated tall oil to a distillation operation.

2. The method of refining tall oil which includes heating tall oil in the presence of a boron compound capable of removing the visible or latent color bodies of said tall oil, and subjecting the treated tall oil to a reduced pressure distillation operation.

3. The method of refining tall oil which includes heating tall oil in the presence of a boron compound capable of removing the visible or latent color bodies of said tall oil, subjecting the treated tall oil to a solvent extraction operation, and recovering the refined tall oil.

4. The method of refining tall oil which includes heating tall oil in the presence of a boron compound capable of removing the visible or latent color bodies of said tall oil, subjecting the treated tall oil to a solvent extraction operation, removal of the tall oil from the solvent, and subjecting the removed tall oil to a reduced pressure distillation operation.

5. The method of refining tall oil which includes the step of subjecting the tall oil to a reduced pressure distillation operation in the presence of a boron compound capable of removing the visible or latent color bodies of said tall oil.

6. The method of refining tall oil which includes the step of heating a solvent solution of tall oil in the presence of a boron compound capable of removing the visible or latent color bodies of said tall oil, and recovering the tall oil.

7. The method of refining crude tall oil which includes heating tall oil in the presence of boric acid, subjecting the treated tall oil to a solvent extraction operation, and recovering the refined tall oil.

8. The method of refining crude tall oil which includes heating tall oil in the presence of borax.

9. The method of refining crude tall oil which includes heating tall oil in the presence of boric anhydride, subjecting the treated tall oil to a solvent extraction operation, and recovering the refined tall oil.

10. The method of refining crude tall oil which includes heating the tall oil in the presence of a boron compound capable of removing the visible or latent color bodies of said tall oil at a temperature of about 125° C. to about 175° C. for a period of about 5 minutes to about 2 hours, subjecting the treated tall oil to a petroleum hydrocarbon solvent extraction operation, and recovering the refined tall oil.

11. The method of refining crude tall oil which includes the step of subjecting the tall oil to a distillation operation at a reduced pressure of less than 20 mm. of mercury and at a temperature of about 200° C. to about 300° C. in the presence of a boron compound capable of removing the visible or latent color bodies of said tall oil.

12. The method of refining tall oil which includes heating tall oil in the presence of a boron compound capable of removing the visible or latent color bodies of said tall oil, and subjecting the treated tall oil to distillation at a pressure between about 1 mm. and about 50 mm. of mercury.

JOSEPH N. BORGLIN.